United States Patent Office 2,929,149
Patented Mar. 22, 1960

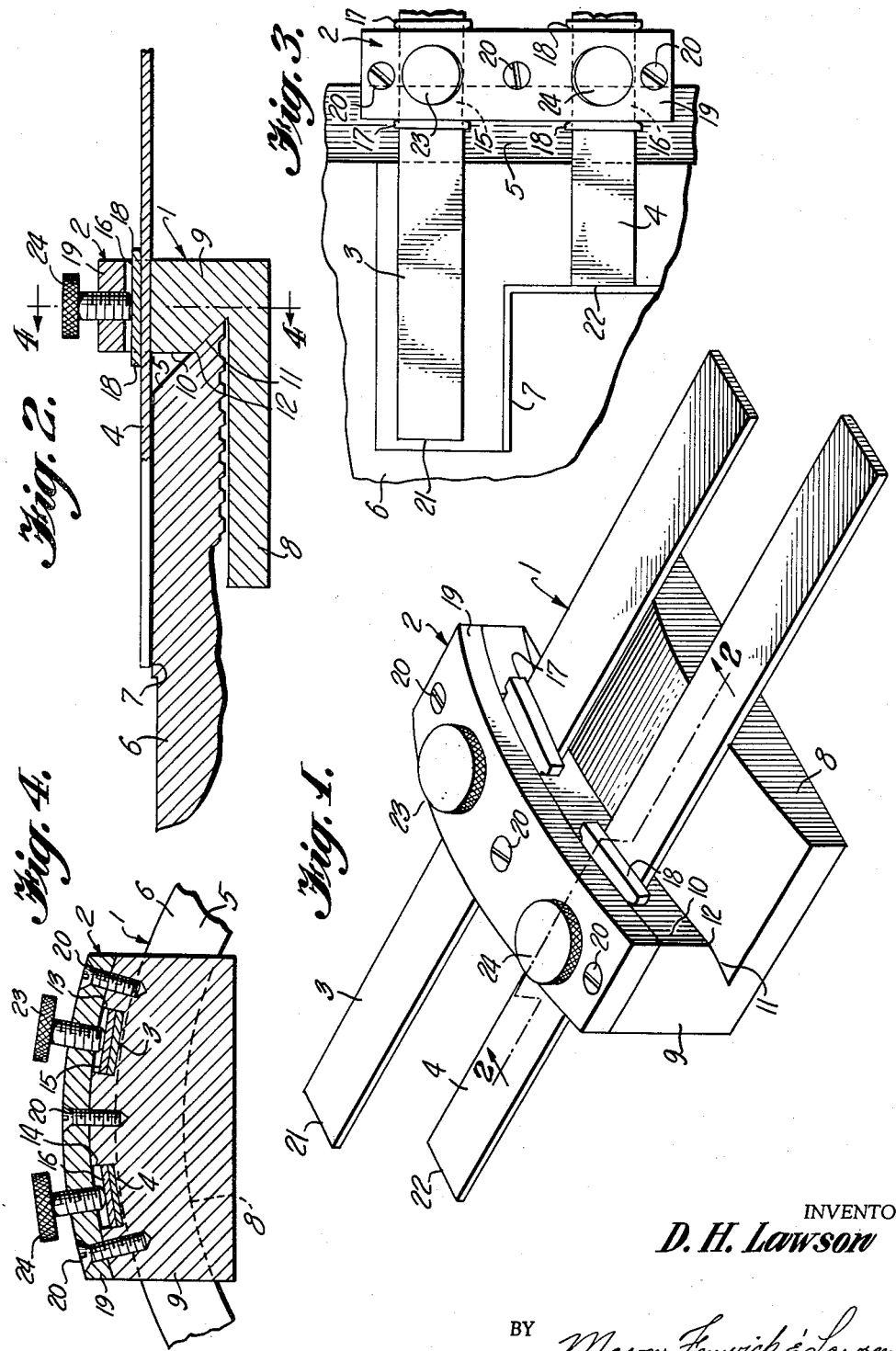

2,929,149

GAUGE FOR REGISTERING PRINTING PLATES

Denway H. Lawson, Newport News, Va.

Application October 28, 1958, Serial No. 770,201

3 Claims. (Cl. 33—184.5)

This invention relates to gauges, and particularly to gauges for use in checking stereotype plates for color printing to assure proper registration of the color plates.

The amount of color printing in newspaper work for advertising, comic sections, etc., is rapidly increasing, and it is becoming more important that simple means for checking plates to obtain proper color registry be provided. It is extremely important in printing color advertising where the color sections appear at different places on a page that each section be properly aligned on the several color plates so that there will be no overlapping, or gaps, in the finished page. The position of the section on the plate must be checked at several points for perfect accuracy. The job is rendered more difficult by the fact that the edges of the plates are bevelled, and frequently the sharp edge has been chipped or otherwise damaged so that its accurate measurements from this edge are impossible.

The principal object of the present invention is to provide a gauge for use in checking stereotype plates to assure proper registration of the several images needed in color printing.

A more specific object is the provision of such a gauge which is capable of being set in accordance with distances of several parts on a plate from the side edge of the plate for subsequent checking of registering plates.

Another object is to provide a gauge which may be quickly and accurately adjusted without the use of special tools or instruments.

A further object is the provision of a gauge of this nature which has a guide engageable with the plate in an area which will be unaffected by a chipped or damaged plate edge.

Other objects of the invention will become apparent from the following description of one practical embodiment thereof, when taken in conjunction with the drawings which accompany, and form part of, this specification.

In the drawings:

Figure 1 is a perspective view of a gauge embodying the principles of the present invention;

Figure 2 is a longitudinal section through the gauge, taken on the line 2—2 of Figure 1, with the gauge shown in operative position upon a printing plate.

Figure 3 is a top plan view of the structure shown in Figure 2; and

Figure 4 is a transverse section through the gauge head, and is taken on the line 4—4 of Figure 2.

In general, the invention consists of a gauge capable of being placed against the edge of a stereotype plate and setting to indicate distances of several points on a printing subject from the edge of the plate for use in checking the subject on matching color plates to assure perfect registration of the plates in printing.

Referring to the drawings in detail, there is shown a gauge 1 which includes a head 2 and gauge blades 3 and 4. The head is to be placed against the bevelled edge 5 of a stereotype plate 6, and the blade ends to be set to register with a printing subject 7 at several plates.

The gauge head is generally right-angular in cross-section, providing a foot 8 to underlie the printing plate and an upstanding stock 9. The inner face 10 of the stock, that is the face at the inside of the angle and which is to confront the plate in use, is recessed, or undercut, adjacent its juncture with the foot at an angle generally that of the plate edge. The angular face 11 of the undercut joins the inner face 10 of the stock along an edge 12 which, in use, will engage the plate bevelled side above the bottom and form a datum for gauging measurement.

The vertical portion, or stock, of the head is provided with a pair of recesses 13 and 14 which slidably receive the blades 3 and 4. The recesses are sufficiently deep to seat the bearing plates 15 and 16. The bearing plates are flat members of substantially the width of the recesses, and have enlarged ends 17 and 18 projecting beyond the stock walls. The enlarged ends will prevent the bearing plates from moving endwise in the recesses. A cap plate 19 is secured to the stock by screws 20 and closes the tops of recesses 13 and 14.

Due to the fact that the stereotype plate is curved, the top surface of the foot portion of the gauge head, the inclined face 11 of the undercut, the datum edge 12, the recess positions and the cap all follow a similar curvature.

The blades are nothing more than elongated flat members having square cut gauging ends 21 and 22. The blades are slidable in the recesses 13 and 14 and held in positions of adjustment by set screws 23 and 24 which are threaded through the cap and seat upon the bearing plates 15 and 16. Tightening the set screws will frictionally bind the blades between the bearing plates and the bottoms of the recesses. The use of the bearing plates provides increased frictional area against the blades and, at the same time, prevents the set screws from marring the blades.

In using the gauge, it is placed against the bevelled edge of a plate to be checked. The stock will rest against the plate with the guide edge 12 in contact with the plate edge at a distance above the bottom edge. This will insure proper measurement even though the bottom edge of the plate should be chipped, notched or otherwise damaged. The head will be slid along the plate until the blades are at the parts of the subject to be measured. The blades are then moved until their ends are in registry with the edges of the subject. The set screws are then tightened to lock the blades relative to the head. The gauge will then be removed from the plate and positioned against a companion plate to check the position of the subject on that plate. If the ends of the blades do not coincide with the subject it will be immediately apparent that proper registration will not be had unless the position of the subject is corrected. Proper shims or cards can be put in place to bring the subject into alignment with the ends of the gauge blades.

It will be apparent from the above that a very simple and efficient gauge has been provided which will save much time in preparing plates for color printing, and will prevent the necessity for setting up the plates and making proofs to test registration.

While in the above one practical embodiment of the invention has been disclosed, it will be apparent that the specific details of construction shown and described are merely by way of example and the invention may take other forms within the scope of the appended claims.

What is claimed is:

1. A gauge for use in checking subject positioning on curved printing plates having inclined side edges comprising, a head including a stock for placement against a side edge of a printing plate and a foot at right angles to the stock to underlie the plate, the face of the stock on the inner side of the angle formed with the foot being undercut to form a datum edge at the juncture of the undercut with said face for contact with the inclined edge of a printing plate above the bottom of the plate edge to position the head relative to the printing plate, gauging blades slidably mounted in the head stock for setting coincident with selected subject points on a printing plate while the said datum edge is in contact with the printing plate, and means to fix the blades in positions of adjustment.

2. In a gauge as claimed in claim 1, the top surface of the foot, said undercut and said datum edge all being formed to the general curvature of the printing plate with which it is to be used.

3. In a gauge as claimed in claim 1, said stock having openings therethrough to receive the gauging blades, bearing plates in the openings above the gauging blades, the means to fix the blades comprising set screws for contact with the bearing plates.

References Cited in the file of this patent

UNITED STATES PATENTS

| | | |
|---|---|---|
| 1,067,067 | Schlueter et al. | July 8, 1913 |
| 1,520,102 | Bassett | Dec. 23, 1924 |
| 2,011,584 | Lengel et al. | Aug. 20, 1935 |
| 2,810,204 | Imshaug | Oct. 22, 1957 |